United States Patent [19]

Jansma

[11] 3,954,680

[45] May 4, 1976

[54] STABILIZED ELECTROCONDUCTIVE POLYMERS

[75] Inventor: Roger H. Jansma, Park Forest, Ill.

[73] Assignee: Nalco Chemical Company, Chicago, Ill.

[22] Filed: May 6, 1974

[21] Appl. No.: 467,405

[52] U.S. Cl............................ 260/2 BP; 260/567.6 P; 260/584 R
[51] Int. Cl.² ........................................ C08G 65/26
[58] Field of Search........ 260/2 BP, 567.6 P, 584 R

[56] References Cited
UNITED STATES PATENTS

| | | | |
|---|---|---|---|
| 3,567,659 | 3/1971 | Nagy | 260/2 |
| 3,663,461 | 5/1972 | Witt | 260/2 BP |
| 3,725,312 | 4/1973 | Panzer et al. | 260/2 BP |
| 3,738,945 | 6/1973 | Panzer et al. | 260/2 BP |

Primary Examiner—Donald E. Czaja
Assistant Examiner—Earl A. Nielsen
Attorney, Agent, or Firm—Kinzer, Plyer, Dorn & McEachran

[57] ABSTRACT

A method of promoting alkaline viscosity stability in polymers formed from a secondary amine, an epihalohydrin and an amount of a crosslinking agent such as a primary amine or ammonia which would cause gelation, comprising reacting said polymer with a tertiary amine; a preferred polymer is formed of epichlorohydrin, dimethylamine and ammonia stabilized with trimethylamine.

8 Claims, No Drawings

STABILIZED ELECTROCONDUCTIVE POLYMERS

BACKGROUND OF THE INVENTION

This invention relates generally to polymers prepared from secondary amines, epihalohydrins and crosslinking agents such as primary amines and ammonia and more particularly concerns improving the viscosity stability of such polymers in alkaline conditions in which, without modification, the polymers would gel.

Polymers of secondary amines and epihalohydrins are known. While these polymers are described as being stable, the reactions being quenched with water, the present invention is concerned with secondary amine-epihalohydrin polymers which are over-dosed with crosslinking agents. By "overdose" is meant an amount of crosslinking agent is added to the polymer which would cause the polymer to gel under alkaline conditions. Crosslinking agents may include ammonia or primary amines or other components which can form a branched chain structure. These overdosed polymers are quite useful when added as binders in high solids coating systems where the excess or overdose of crosslinking agents is necessary to form an adequate cure of the system.

SUMMARY OF THE INVENTION

In accordance with the invention, alkaline viscosity stability is promoted in polymers of secondary amines and epihalohydrins with an overdose of crosslinking agent by reacting the polymer with a tertiary amine. In particular, the preferred polymer is that of epichlorohydrin and dimethylamine with an overdose of ammonia reacted with trimethylamine.

Other and further objects of the present invention will be apparent from the following description and claims which disclose a preferred embodiment of the present invention and the principle thereof and what is now considered to be the best mode contemplated in applying that principle. Other embodiments of the invention embodying the same or equivalent principle may be used as desired by those skilled in the art without departing from the present invention.

DETAILED DESCRIPTION OF THE INVENTION

The major reactions involved in preparation of the polymer are believed to be as follows for the preferred product:

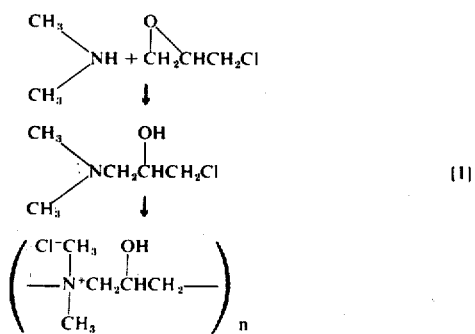

Under normal reaction conditions, for this reaction to go to very high yields, it is necessary to include a crosslinking agent (such as $NH_3$) to promote three dimensional polymer growth so that a high molecular weight polymer can be prepared. The side reactions which inhibit high yields of the preferred reaction as shown above are not well defined but probably include hydrolysis of the chlorine in the epichlorohydrin, hydrolysis of the epoxide in the epichlorohydrin, and cyclization of [1] instead of linear chain growth.

Realistic commercial use of a crosslinking agent demands that it be used in excess of the minimum amount required to produce the desired high molecular weight polymer. This is so that reaction times can be held to a minimum and also so that slight batch-to-batch variations can still produce a polymer of the desired molecular weight.

Molecular weight building reactions of the polymers above (or during alkaline storage or use) are believed to be as follows:

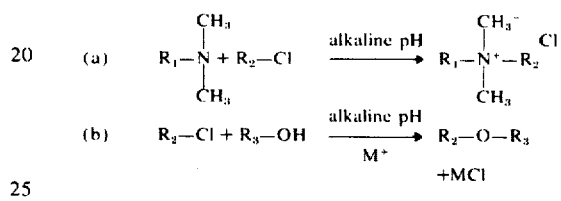

wherein $R_1$, $R_2$, and $R_3$ are chains of repeating polymeric units, and $M^+$ is a proton donor.

Both of these reactions are prevented by consuming the organic halide or chlorine function present in the polymer with the tertiary amine.

The secondary amine may be a dialkyl amine and contain alkyl substituents with the same or different number of carbon atoms. Some examples are dimethylamine, ethyl-methylamine, diethylamine and dibutylamine.

In the reactions an overdose of crosslinking agent such as a primary amine or ammonia are added to provide branching throughout the polymer system. Some examples of crosslinking agents are methylamine, ethylamine and ammonia. Any crosslinking agent which will form branches in the presence of amines, epoxides or alkyl halides is suitable.

The other reactant for the polymer is a compound that has at least one epoxide function and at least one alkyl halide function. Some examples are epihalohydrins and preferably epichlorohydrin. It is possible to use monomers with more than one each of these separate functions to provide branching from this reactant in addition to that of the crosslinking agents. In any case, the amount of the branching monomers and crosslinking agents will be varied according to the desired branching and viscosity, more branching monomers and crosslinking agents used for higher viscosities or desired curing characteristics.

The stabilizing agent is suitably any tertiary amine, but in particular trimethylamine is preferred. Once the initial overdosed polymer is formed, base is added to build up viscosity and then tertiary amine is added to stabilize. The tertiary amine may be added along with the base when producing low viscosity final products. The addition of the tertiary amine may be delayed to allow the polymer to further build up viscosity, and when a desired viscosity increase is obtained, the tertiary amine may be added to stabilize the reaction. Of course, if addition of the tertiary amine is delayed too long the reaction may have proceeded too far to be stabilized and will form a gel. Depending upon the amount of base added, the reaction conditions, the amount of overdose of crosslinking agents, and the amount of branching monomer, the longest delay in the addition of the tertiary amine will vary.

The following examples are included to give a general idea of the practice of the present invention, however they are not intended to limit the invention to such and the invention shall only be limited by the appended claims.

EXAMPLE 1

Preparation of a secondary amine - epihalohydrin polymer.

3733 parts of water were charged to a stirred pressure vessel with provision for water cooling. Pressure was reduced in the vessel to approximately 100 mm. absolute. At this time cooling water was started circulating through the jacket of the reaction vessel, 210 parts of 28% aqueous ammonia and 2335 parts of 60% aqueous dimethylamine were charged to the vessel bringing the pH to 11–12. 3519 parts of epichlorohydrin were gradually metered in at a rate such that the reaction exotherm was carried to 80°C and maintained at that temperature by adjustment of the rate of epichlorohydrin addition. After the epichlorohydrin was added (approximately 8 hours) the cooling water was stopped and the reaction maintained at 80°C for an additional 30 minutes. The pH of the reaction mixture had dropped to approximately 6–7 at this time. The product was then allowed to cool to ambient temperature. This product was a clear, viscous liquid with a Brookfield viscosity of 200 cp. Note that these polymers are stable under acidic conditions and that without addition of base will remain acidic, stable and are usually of low molecular weight.

EXAMPLE 2

Alkaline instability with delayed addition of tertiary amine.

600 grams of the product of Example 1 was charged to a 2000 ml. glass resin flask equipped with stirrer, a reflux condenser, thermometer, and a glass jacket for steam heating or water cooling and diluted with 150 grams of water. 13.5 grams of 50% sodium hydroxide was then added and the reaction mixture heated to 80°C where it was maintained. The pH of the reaction mixture was 7–8 at this point. The viscosity increase for the reaction mixture was followed by periodically withdrawing, cooling and measuring samples. When the viscosity of the reaction mixture reached 450 cp. (delay of 2 hours, 40 minutes) 50 grams of 25% aqueous trimethylamine was added bringing the pH to approximately 9. Within 10 minutes the reaction mixture had gelled to an immobile mass. Thus, for the polymer of Example 1, the tertiary amine stabilizing agent must be added prior to reaching a viscosity of 450 c.p. to avoid gel formation.

EXAMPLE 3

Preparation of an alkaline stable polymer by initial addition of tertiary amine.

The same procedure was followed as in Example 2, however, the trimethylamine was charged at the initial point (no delay) along with the sodium hydroxide. This product never achieved greater than 88 cp. viscosity.

EXAMPLE 4

Preparation of an alkaline stable polymer by delayed addition of tertiary amine.

The same procedure was followed as with Example 2, however, the viscosity of the reaction mixture was allowed to rise to 250 cp. (delay of 1 hour, 30 minutes) before the trimethylamine was added. After trimethylamine addition the viscosity rose rapidly to 590 cp. and leveled off at that point. The excess trimethylamine was then vacuum stripped and the reaction mixture cooled and adjusted to pH = 6 with 3 ml. of 37% hydrochloric acid. This product's alkaline stability was tested by adjusting its pH to 8.5 with sodium hydroxide and placing in a 63°C oven for 16 hours. During this period viscosity increased from 610 cp. to 658 cp. A similar polymer prepared without benefit of the trimethylamine treatment gels to a solid mass under these conditions.

The initial viscosities of Examples 2 and 4 were about 90 cp. after addition of the base. Example 3 showed a lower initial viscosity of 70 cp. because of addition of the aqueous trimethylamine solution along with the base. This lowering of percent solids reduced the measured viscosity. When trimethylamine solution was delayed after the base addition in Examples 2 and 4, it caused short downward fall in their smooth viscosity increase curves.

I claim:

1. A polymer of a secondary amine and a monomer containing at least one vicinal expoxide function and at least one alkyl halide function with an overdose of crosslinking agent, and stabilized with a tertiary amine reactive with said alkyl halide function, said cross-linking agent being selected from the group consisting of primary amines, ammonia and mixtures thereof.

2. A polymer as in claim 1 wherein said monomer is an epihalohydrin.

3. A polymer as in claim 1 wherein the secondary amine is dimethylamine, the monomer is epichlorohydrin, the crosslinking agent is ammonia, and the tertiary amine is trimethylamine.

4. A method of promoting alkaline viscosity stability in a polymer of a secondary amine and a monomer containing at least one vicinal epoxide function and at least one alkyl halide function and an overdose of crosslinking agent, comprising reacting said polymer with a tertiary amine reactive with said alkyl halide function, said crosslinking agent being selected from the group consisting of primary amines, ammonia and mixtures thereof.

5. A method as in claim 3 wherein the tertiary amine is added about simultaneously with a base.

6. A method as in claim 4 wherein the tertiary amine is added after the base has caused a viscosity build up in said polymer but before the viscosity build up has proceeded too far to avoid gel formation.

7. A method as in claim 3 wherein said monomer is an epihalohydrin.

8. A method as in claim 7 wherein said secondary amine is dimethylamine, said monomer is epichlorohydrin, said crosslinking agent is ammonia and said tertiary amine is trimethylamine.

* * * * *